(12) United States Patent
Fereidooni et al.

(10) Patent No.: US 10,844,835 B2
(45) Date of Patent: Nov. 24, 2020

(54) OFFSET PERPENDICULAR AXIS TURBINE

(71) Applicant: NATIONAL RESEARCH COUNCIL OF CANADA, Ottawa (CA)

(72) Inventors: Amin Fereidooni, Ottawa (CA); Doma Seleman Hilewit, Ottawa (CA); Edgar A. Matida, Ottawa (CA); Fred Nitzsche, Ottawa (CA)

(73) Assignee: National Research Council of Canada, Ontario (CA)

( * ) Notice: Subject to any disclaimer, the term of this patent is extended or adjusted under 35 U.S.C. 154(b) by 137 days.

(21) Appl. No.: 15/639,792

(22) Filed: Jun. 30, 2017

(65) Prior Publication Data

US 2019/0003453 A1  Jan. 3, 2019

(51) Int. Cl.
| | | |
|---|---|---|
| *F03D 3/06* | (2006.01) | |
| *F03D 3/00* | (2006.01) | |
| *F03B 17/06* | (2006.01) | |
| *F03B 13/26* | (2006.01) | |

(52) U.S. Cl.
CPC ............ *F03D 3/065* (2013.01); *F03B 13/264* (2013.01); *F03B 17/063* (2013.01); *F03D 3/005* (2013.01); *F03D 3/061* (2013.01); *F05B 2220/32* (2013.01); *F05B 2240/212* (2013.01); *F05B 2240/60* (2013.01); *F05B 2250/25* (2013.01); *F05B 2250/33* (2013.01); *F05B 2250/71* (2013.01)

(58) Field of Classification Search
CPC ........ F03B 17/063; F03D 3/061; F03D 3/005; F03D 3/065; F03D 7/06; F03D 3/02; F05B 2240/212; F05B 2250/71; F05B 2250/33; F05B 2250/25; F05B 2240/60; F05B 2220/32
See application file for complete search history.

(56) References Cited

U.S. PATENT DOCUMENTS

| | | | | |
|---|---|---|---|---|
| 4,065,225 A | * | 12/1977 | Allison ................. | F03D 7/0224 416/121 |
| 4,293,274 A | * | 10/1981 | Gilman ................... | F03D 3/061 416/132 B |
| 5,269,647 A | * | 12/1993 | Moser ..................... | B63H 1/265 415/2.1 |
| 5,405,246 A | * | 4/1995 | Goldberg ................ | F03D 3/061 416/227 A |

(Continued)

FOREIGN PATENT DOCUMENTS

WO    WO-2014106765 A1 *   7/2014    .............. F03B 3/121

OTHER PUBLICATIONS

McNerney, G. M.: Accelerometer measurements of aerodynamic torque on the DOE/Sandia 17-m Vertical Axis Wind Turbine, Tech. rep., Sandia National Labs., Albuquerque, NM (USA), 1981.

(Continued)

*Primary Examiner* — Hung Q Nguyen
(74) *Attorney, Agent, or Firm* — Jason E. J. Davis

(57) ABSTRACT

A perpendicular axis turbine having at least two blades, wherein the blades are longitudinally offset with respect to one another, reducing the effects of blade-vortex interaction and providing increased power generation. In one embodiment, the blades are longitudinally offset such that the attachment point of one blade is halfway between the attachment points for the other blade.

20 Claims, 16 Drawing Sheets

(56) References Cited

U.S. PATENT DOCUMENTS

| | | | | |
|---|---|---|---|---|
| 6,345,957 | B1* | 2/2002 | Szpur | F03D 3/065 416/197 A |
| 7,766,600 | B1* | 8/2010 | Vanderhye | B63H 13/00 415/4.2 |
| 8,393,853 | B2* | 3/2013 | Sauer | F03B 13/264 415/72 |
| 9,328,713 | B2* | 5/2016 | Beaston | F03B 13/14 |
| 2002/0006334 | A1* | 1/2002 | Szpur | F03D 3/065 416/197 A |
| 2008/0075595 | A1* | 3/2008 | Proven | F03D 3/064 416/140 |
| 2009/0129928 | A1* | 5/2009 | Sauer | F03B 13/264 416/176 |
| 2009/0196763 | A1* | 8/2009 | Jones | F03D 3/005 416/90 R |
| 2010/0086406 | A1* | 4/2010 | Schaap | F03D 3/005 416/204 R |
| 2011/0006543 | A1* | 1/2011 | Hu | F03D 3/02 290/55 |
| 2011/0027084 | A1* | 2/2011 | Rekret | F03D 3/02 416/126 |
| 2012/0128500 | A1* | 5/2012 | Perless | F03D 3/061 416/223 R |
| 2012/0224968 | A1* | 9/2012 | Lux | F03D 3/005 416/196 A |
| 2013/0108458 | A1* | 5/2013 | Goldstein | F03D 3/061 416/240 |
| 2013/0156585 | A1* | 6/2013 | Mangano | F03D 3/064 416/210 R |
| 2014/0010654 | A1* | 1/2014 | Fajardo | F01D 7/00 416/147 |
| 2014/0161615 | A1* | 6/2014 | Hayman | B63H 1/12 416/170 R |
| 2016/0160650 | A1* | 6/2016 | Kullander | F03B 13/183 416/176 |
| 2018/0017038 | A1* | 1/2018 | Cimatti | F03D 1/06 |

OTHER PUBLICATIONS

Benedict, M., et al.: Fundamental understanding of the physics of a small-scale vertical axis wind turbine with dynamic blade pitching: An experimental and computational approach, 54th AIAA/ASME, 54, 1553, 2013.

Dabiri, J. O.: Potential order-of-magnitude enhancement of wind farm power density via counter-rotating vertical-axis wind turbine arrays, Journal of Renewable and Sustainable Energy, 3, 043 104, 2011.

Fereidooni, A.: Numerical Study of Aeroelastic Behaviour of a Troposkien Shape Vertical Axis Wind Turbine, Master's thesis, Carleton University, 2013.

Fereidooni, A., et al.: Aeroelastic Study of a Vertical Axis Wind Turbine with Troposkien Shape, in: 32nd ASME Wind Energy Symposium, p. 0716, 2014.

Islam, M., et al.: Aerodynamic models for Darrieus-type straight-bladed vertical axis wind turbines, Renewable and Sustainable Energy Reviews, 12, 1087-1109, 2008.

Ramler, J. R. et al.: Wind turbines for electric utilities: Development status and economics, Terrestrial Energy Systems Conference sponsored by American Institute of Aeronautics and Astronautics, Orlando, Florida, 1979.

Musial, W. et al.: Large-scale offshore wind power in the United States: Assessment of opportunities and barriers, Tech. rep., National Renewable Energy Laboratory (NREL), Golden, CO., 2010.

Paraschivoiu, I.: Wind Turbine Design: with emphasis on Darrieus concept, Presses internationales Polytechnique, 2002.

Peace, S.: Another approach to wind: vertical-axis turbines may avoid the limitations of today's standard propeller-like machines, Mechanical Engineering-CIME, 126, 28-32, 2004.

Shires, A.: Design optimisation of an offshore vertical axis wind turbine, Proceedings of the ICE-Energy, 166, 7-18, 2013.

Sun, X., et al.: Aerodynamic performance and characteristic of vortex structures for Darrieus wind turbine. II. The relationship between vortex structure and aerodynamic performance, Journal of Renewable and Sustainable Energy, 6, 043 135, 2014.

Touryan, K, et al.: Electric power from vertical-axis wind turbines, Journal of Propulsion and Power, 3, 481-493, 1987.

Vita, L., et al.: A Novel Floating Offshore Wind Turbine Concept: New Development, Proc. EWEC, Warszaw, Poland, 2010.

Blackwell, B. F. et al.: Some geometrical aspects of troposkein as applied to vertical axis wind turbine, Tech. rep, 1975.

* cited by examiner

OFFSET PERPENDICULAR AXIS TURBINE

TECHNICAL FIELD

The present invention relates to turbines for wind and water applications. More specifically, it relates to turbines with a central rotary axis that is perpendicular to the flow of wind or water.

BACKGROUND

Turbines have been used for centuries to harvest energy from wind and water. Perpendicular axis turbines, where the fluid flow is perpendicular to the axis, are less common than turbines with axes parallel to the flow, but can provide significant advantages.

In the wind power industry, perpendicular axis turbines are known as "vertical axis wind turbines", or "VAWTs". VAWTs are increasingly used for energy harvesting, particularly in urban settings and deep-water applications. They provide many advantages over the more common horizontal axis wind turbines (HAWTs).

Maintenance of VAWTs is easier and safer than maintenance of HAWTs, as the gearbox and generator of a VAWT are located at ground level. Further, the blades of a VAWT generally attach to the central turbine shaft at at least two places, providing greater mechanical stability than the single attachment point of a HAWT's radial blades. Additionally, as VAWTs have a lower centre of gravity, they are intrinsically more stable than horizontal axis wind turbines. Finally, VAWTs can harvest energy regardless of wind direction, and are thus well-suited to operations where location is not negotiable and yawing systems are obviated. However, VAWTs suffer an inherent deficiency relative to HAWTs that results from the complex aerodynamic interaction of the blades. As an upstream blade of a VAWT deflects the air, it leaves vortices in its wake that change the aerodynamic interaction with downstream blades. This reduces the overall efficiency of the turbine and decreases the power it can generate.

This effect, known as "Blade-Vortex Interaction" or "BVI", is more noticeable at higher turbine speeds. At low turbine speeds, the wind moves the vortices away from the blades before the BVI effect becomes pronounced. However, when the turbine speed is significantly faster than the wind speed, the wind cannot clear away the vortices quickly enough, and the BVI effect becomes important.

Blade-vortex interaction effects are relevant to perpendicular turbines whether in air or in water. The ratio of turbine speed to fluid speed is referred to as the "Tip Speed Ratio" and is commonly abbreviated as "TSR". A high tip speed ratio—which implies high RPMs
is often desirable, as most generators are optimized for high-RPM inputs. Thus, there is a need for perpendicular axis turbines that reduce the effects of Blade-Vortex Interaction at high tip speed ratios.

SUMMARY

The present invention provides a perpendicular axis turbine having at least two blades, wherein the blades are longitudinally offset with respect to one another, reducing the effects of blade-vortex interaction and providing increased power generation. In one embodiment, the blades are longitudinally offset such that the attachment point of one blade is halfway between the attachment points for the other blade.

The present invention provides a perpendicular axis turbine comprising:
 a central turbine shaft;
 a first blade having an airfoil cross-section, said first blade being attached to the central turbine shaft, said first blade defining a first path as said first blade revolves about a central axis of said central turbine shaft; and
 a second blade having an airfoil cross-section, said second blade being attached to the central turbine shaft, said second blade defining a second path as said second blade revolves about said central axis of said central turbine shaft;
 wherein a shape of the second blade is the same as a shape of the first blade and a first profile of said first path partially intersects a second profile of said second path.

BRIEF DESCRIPTION OF THE DRAWINGS

The present invention will now be described by reference to the following figures, in which identical reference numerals refer to identical elements and in which.

DETAILED DESCRIPTION

Figure 1A:
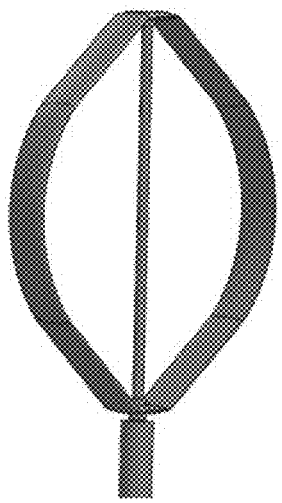
FIG. 1A shows a perpendicular axis turbine with a conventional non-offset Darrieus troposkein rotor.
Figure 1B:
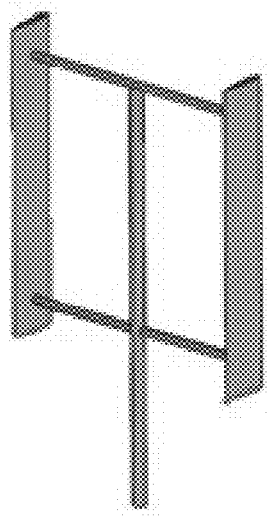
FIG. 1B shows a perpendicular axis turbine with an non-offset H-Darrieus rotor.
Figure 1C:
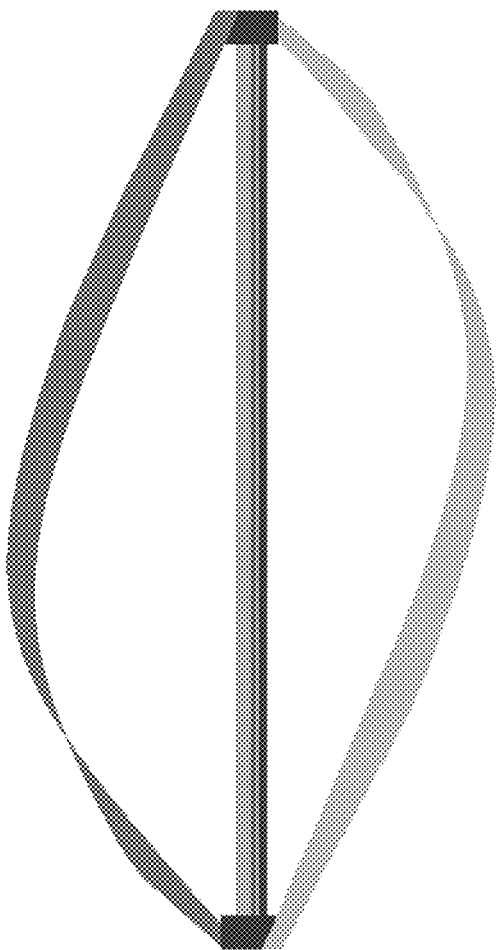
FIG. 1C shows a perpendicular axis turbine with a non-offset helical troposkein rotor.

Various different types of perpendicular axis turbines have been explored in the prior art. FIGS. 1A-1C show three common types of turbines. FIG. 1A shows a conventional Darrieus troposkein rotor. FIG. 1B shows an H-Darrieus rotor with straight blades. FIG. 1C shows a helical (or "twisted") turbine, which is similar to the conventional Darrieus troposkein except that the blades are bent so that the lower attachment points are angularly displaced relative to the upper attachment points.

Though FIGS. 1A-1C show only two-bladed turbines, VAWTs may have three or more blades. The only limit on blade number is a practical limit: as the number of blades increases, the aerodynamic behaviour becomes more complex and the blade-vortex interaction effects occur at lower turbine-speed-to-wind-speed ratios.

Figure 2:
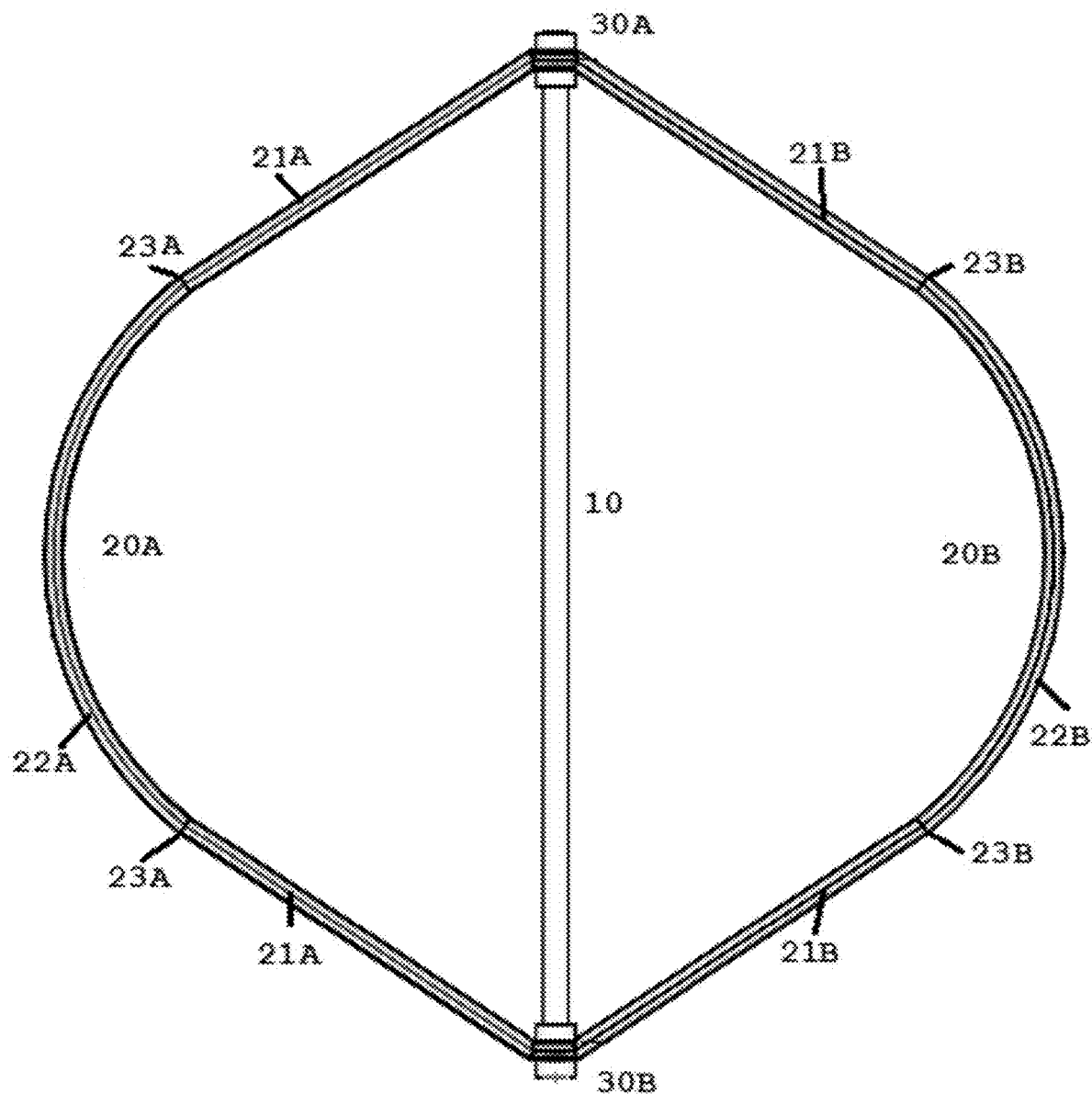
FIG. 2 shows an enlarged side view of a perpendicular axis turbine with a two-bladed conventional non-offset Darrieus troposkein rotor.

FIG. 2 shows an expanded view of the conventional Darrieus troposkein turbine of FIG. 1A. The first blade 20A and the second blade 20B are attached at both ends to the central turbine shaft 10, at attachment points 30A and 30B. As the two blades 20A and 20B have identical shapes, they sweep the same area and follow the same path. Thus, blade 20B will interact with any vortices left in the wake of blade 20A, unless those vortices are cleared away (by the wind or water flow).

Figure 3:
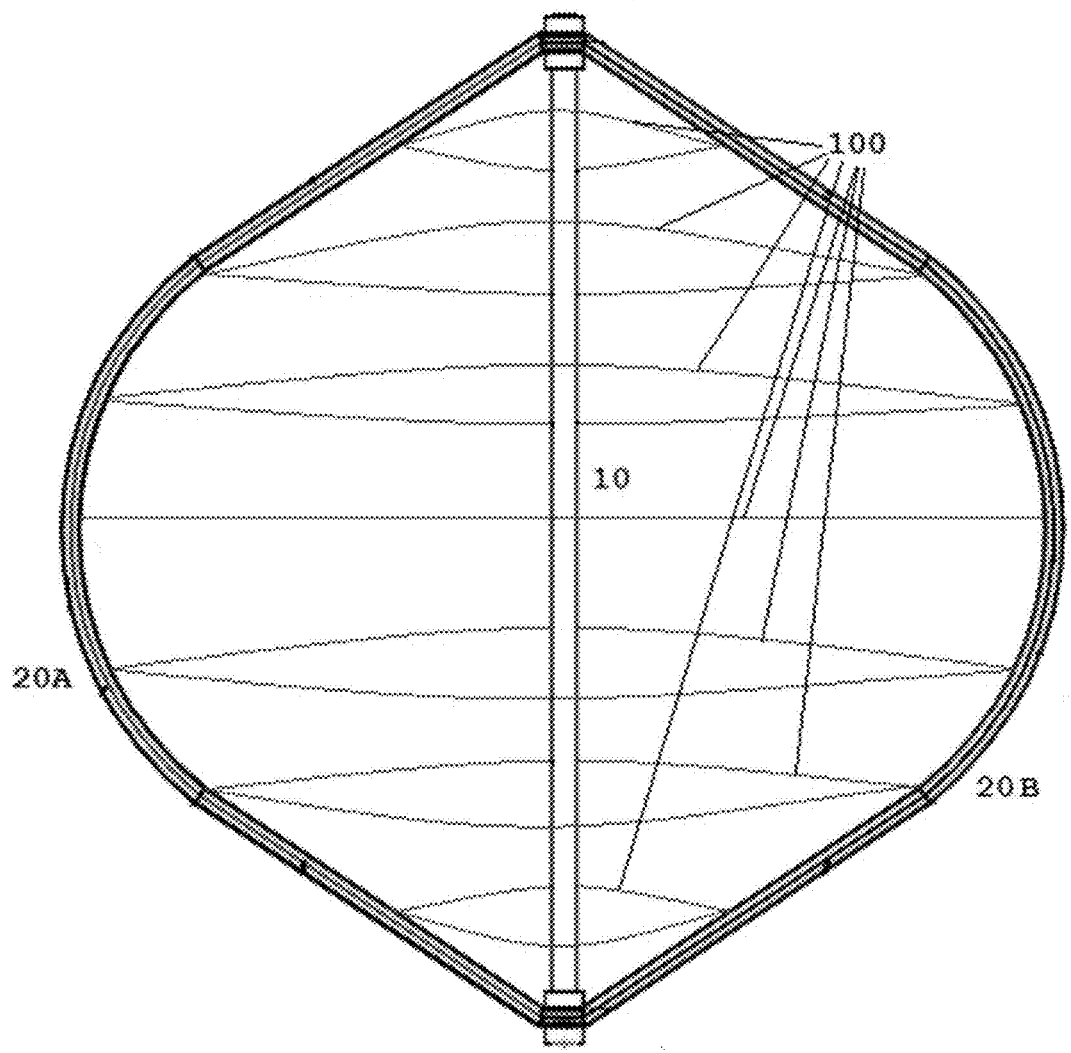
FIG. 3 shows the blade path profile of a two-bladed conventional non-offset Darrieus troposkein rotor.

Referring to FIG. 3, the path profile of the conventional turbine is shown as a series of curved lines 100. Both blades 20A and 20B will follow this same path profile.

Note that the shape of blades 20A and 20B is not a perfect troposkein shape. A perfect troposkein shape is the arc produced when a string is held at both ends and spun quickly. A perfect troposkein has a different curvature at every point on its length and, as a result, is difficult to manufacture. Instead, a "straight/arc approximation" is commonly used in perpendicular axis turbine design. Referring to FIG. 2, the straight/arc approximation features two straight sections 21A, 21B for each blade joined to a middle circular section 22A, 22B at join points 23A, 23B. For practical purposes, the straight/arc approximation shape behaves as a true troposkein. The vast majority of the deflection of the flow by this revolving blade is produced by the circular sections 22A and 22B. The straight sections 21A and 21B are preferred for their nearly ideal stress concentrations.

It should be clear that the angles between the blades of a perpendicular axis turbine should be equal. That is, in a two-blade configuration the blades should be separated by 180°. In a three-blade configuration, each blade should be 120° from its adjacent blade and so on. Evenly distributing the blades in this way provides the greatest stability for the turbine.

Figure 4:
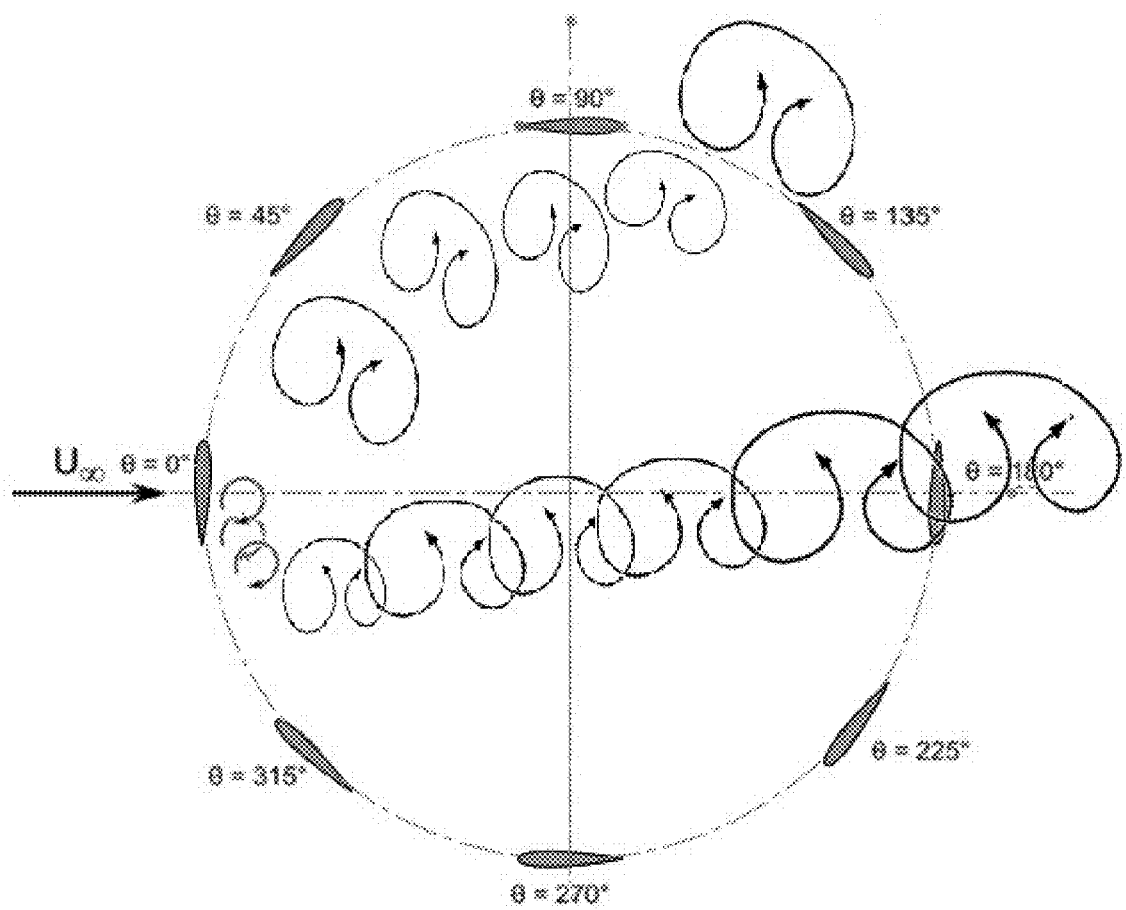
FIG. 4 shows a top view of the vortices caused by a single blade of a Darrieus troposkein rotor, the blade having an airfoil cross-section.

FIG. 4 shows a top-down view of the vortices generated by a single troposkein blade having an airfoil cross-section as it traverses one complete rotation about the turbine axis. The turbine is primarily lift-driven, and an airfoil cross-section capitalizes on that lift, thereby optimizing power generation.

Figure 5:
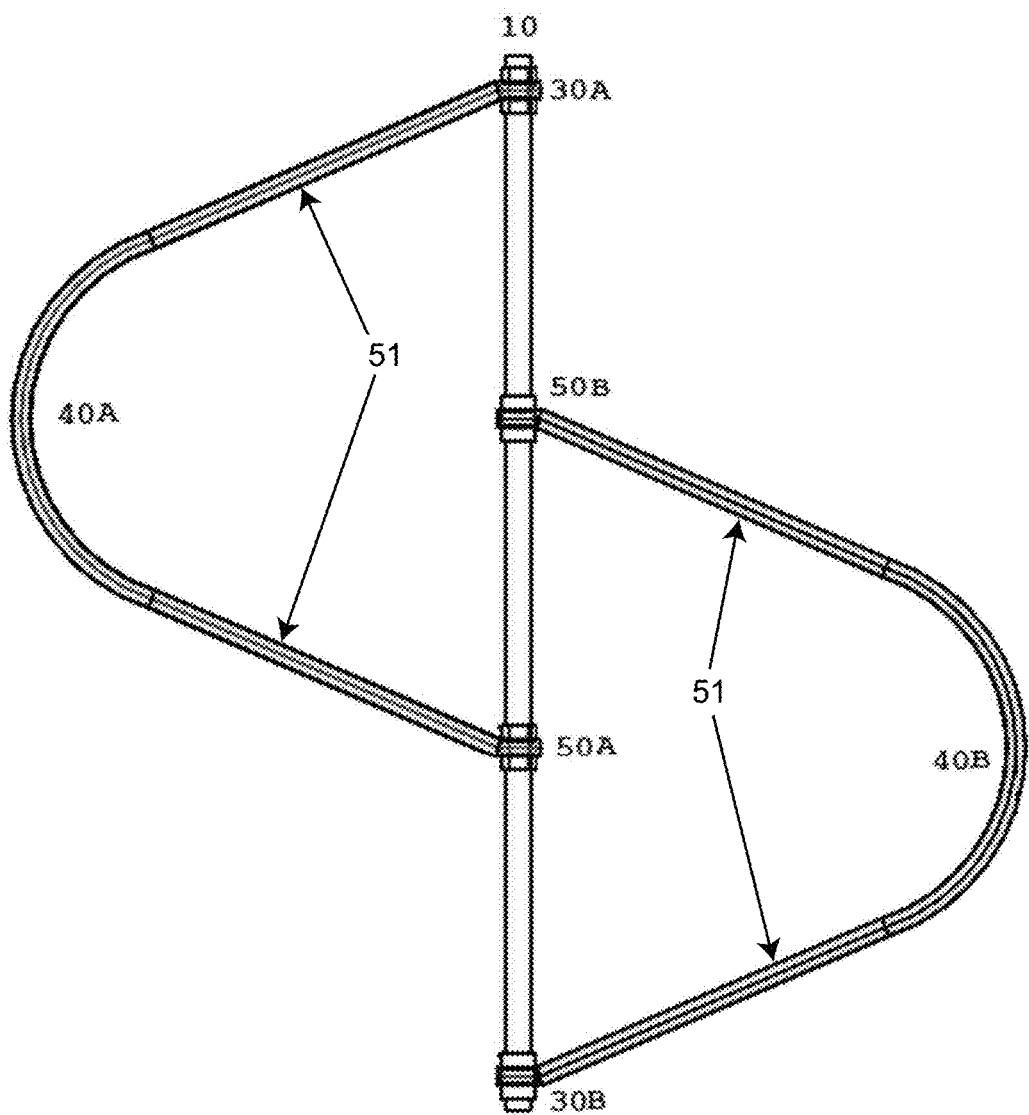
FIG. 5 shows a perpendicular axis turbine with a two-bladed, 50%-offset, Darrieus troposkein rotor.

FIG. 5 shows one embodiment of the invention: two blades 40A and 40B, having identical shapes, are longitudinally offset with respect to each other when attached to a central turbine shaft. Blade 40A is attached to the central turbine shaft 10 at the upper attachment point 30A and at the attachment point 50A. The attachment point 50A is halfway between the attachment points 50B and 30B. Blade 40B, similarly, is attached to the central turbine shaft 10 at the attachment point 50B and at the lower attachment point 30B. The attachment point 50B is halfway between the attachment points 30A and 50A. This configuration is referred to as a "50% offset", as each blade is attached halfway (i.e., 50%) between the attachment points of the other blade. Both blades 40A and 40B are shown as the approximated circular and linear blades of FIGS. 2 and 3. Alternatively, truer approximations to the troposkein shape, or other approximations, are equally possible. Helical blades may also be used. Specifically, the linear members 51 as seen in FIG. 5 may have any other angle with respect to the axis, although the angle would generally be above 20°. The H-Darrius structure (FIG. 1B), with the blade extended from the shaft by horizontal struts, may equally be used. This H-Darrieus structure essentially replaces the angled linear members with these horizontal struts, reducing the height of the turbine but increasing the stress concentration in the blade where it meets the struts.

It should be clear that the offset blades 40A and 40B in FIG. 5 do not have the same profile as the non-offset blades 20A and 20B in FIG. 2. For the same turbine height, changing the blade offset parameter requires a change in blade curvature. Calculations for various blade sets will be shown in the example below.

Figure 6:
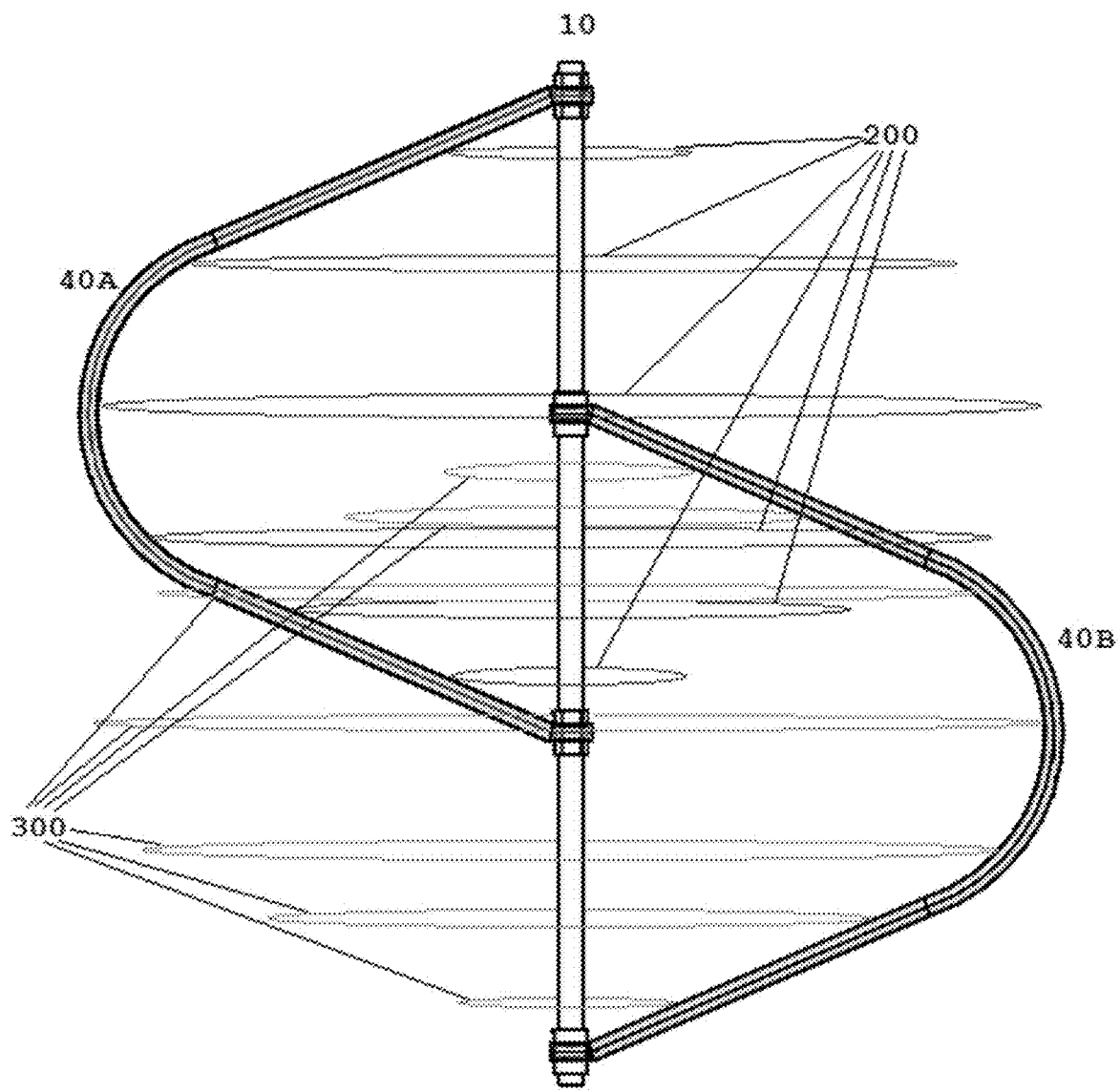
FIG. 6 shows the blade path profile of a two-bladed, 50%-offset, Darrieus troposkein rotor.

FIG. 6 shows the blade path profiles of blades 40A and 40B. Blade 40A sweeps out the path represented by the circles 200, while blade 40A sweeps out the path represented by the circles 300. The two paths 200 and 300 intersect in the middle portion of the central turbine shaft 10.

Figure 7:
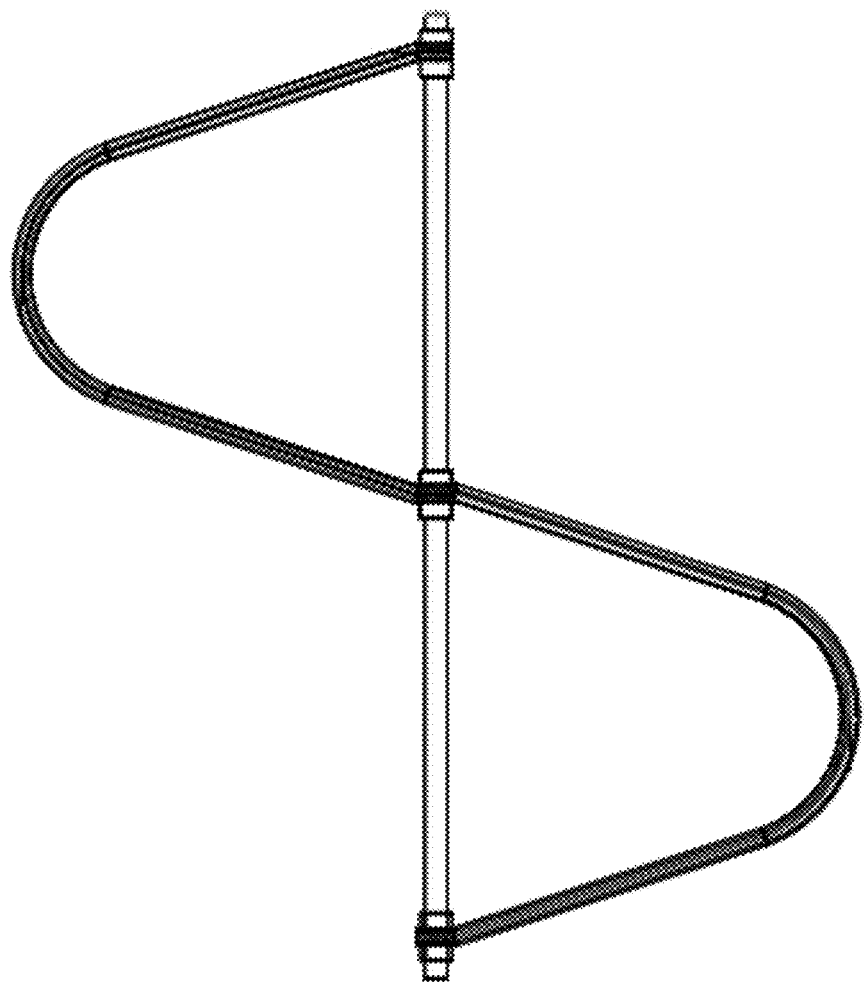
FIG. 7 shows a perpendicular axis turbine with a two-bladed, 100%-offset, Darrieus troposkein rotor.
Figure 8:
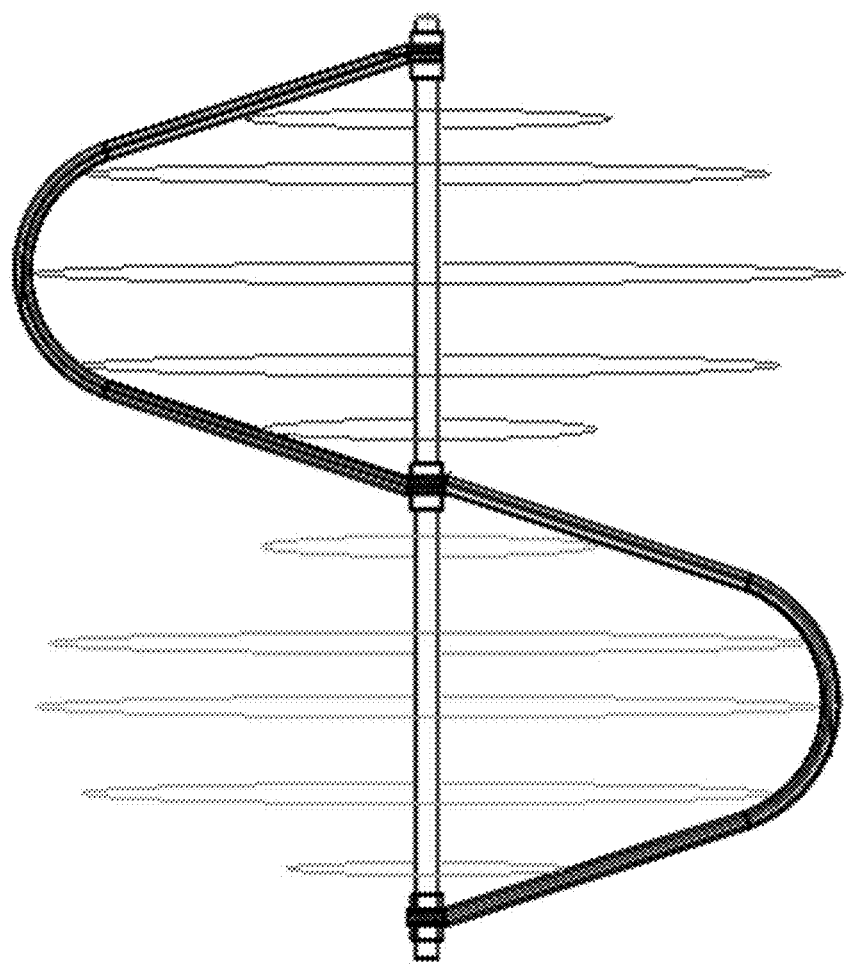
FIG. 8 shows the blade path profile of a two-bladed, 100%-offset, Darrieus troposkein rotor.

FIGS. 7 and 8, provided for reference only, show the extreme case of offset: a "100% offset" turbine, where the blade paths do not overlap at all (see FIG. 8). The extreme case has drawbacks that may negate the benefit derived from the reduced blade-vortex interaction effect.

Figure 9:
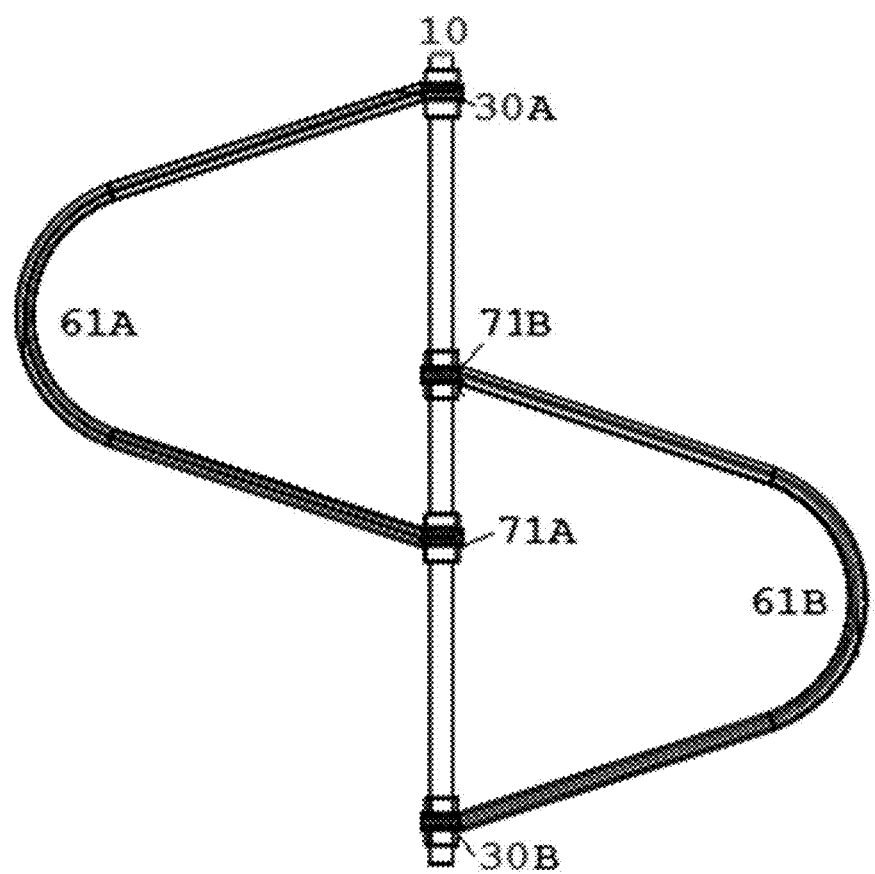
FIG. 9 shows a perpendicular axis turbine with a two-bladed, 33%-offset, Darrieus troposkein rotor.
Figure 10:
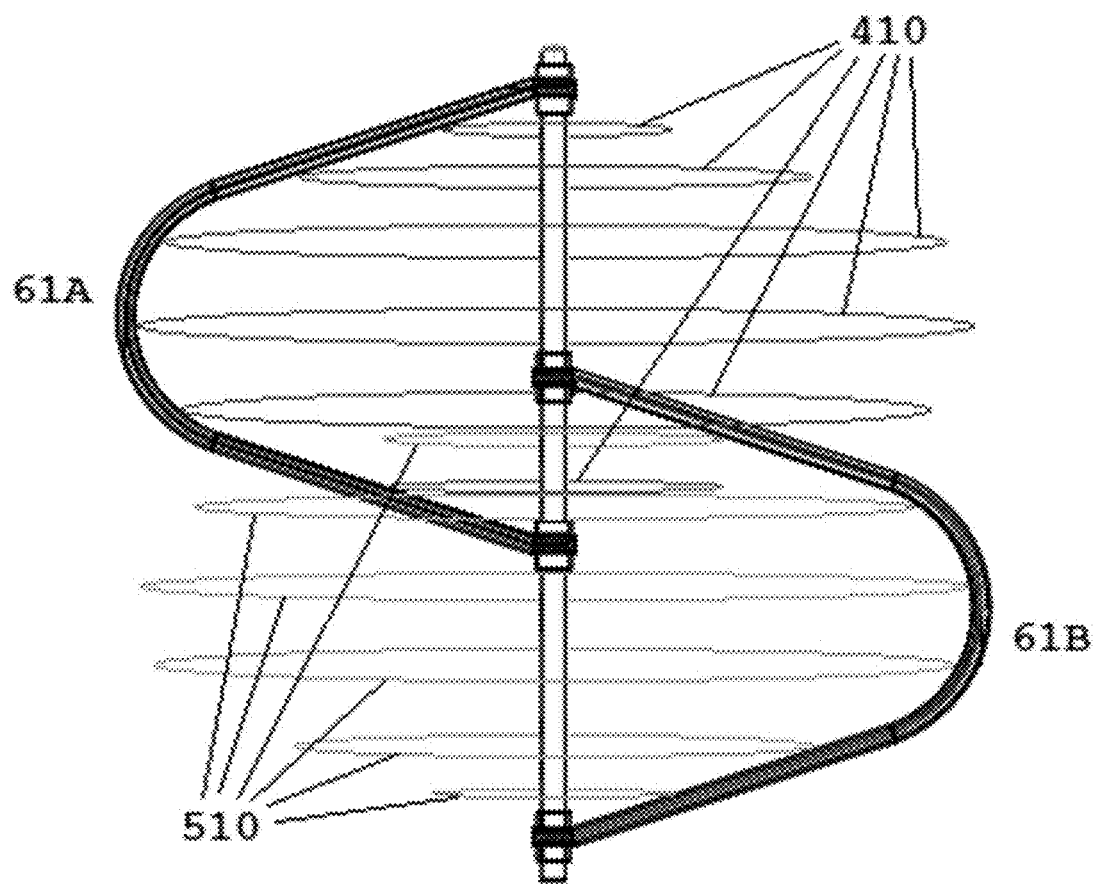
FIG. 10 shows the blade path profile of a two-bladed, 33%-offset, Darrieus troposkein rotor.

Other embodiments may be conceived having different offset parameters (for instance, a 33% offset, where an attachment point for each blade lies 33% of the distance between the attachment points of the other blade), as in FIG. 9. In FIG. 9, the blades 61A and 61B are joined to the central turbine shaft 10 at attachment points 30A and 71A, and 71B and 30B, respectively. Attachment point 71A lies at a percentage distance of 33% of the distance between attachment points 71B and 30B measured from point 71B, and attachment point 71B lies at a percentage distance of 33% of the distance between attachment points 71A and 30A measured from connection point 71A. FIG. 10 shows the blade path profile of the 33% two-bladed turbine of FIG. 9, the path profiles indicated by 410 and 510. It should be clear that still other offset parameters may be used: the useful range of the offset parameter is between 20% and 99%, inclusive.

In addition, it should also be clear that different blade types used in perpendicular axis turbines may also be offset. Although the examples and equations below are focused on a two-bladed configuration with a non-truncated Darrieus troposkein blade shape, the vertical offset technique may be applied to any lift-driven vertical axis wind turbine, with any blade profile, and with any number of blades.

Figure 11:
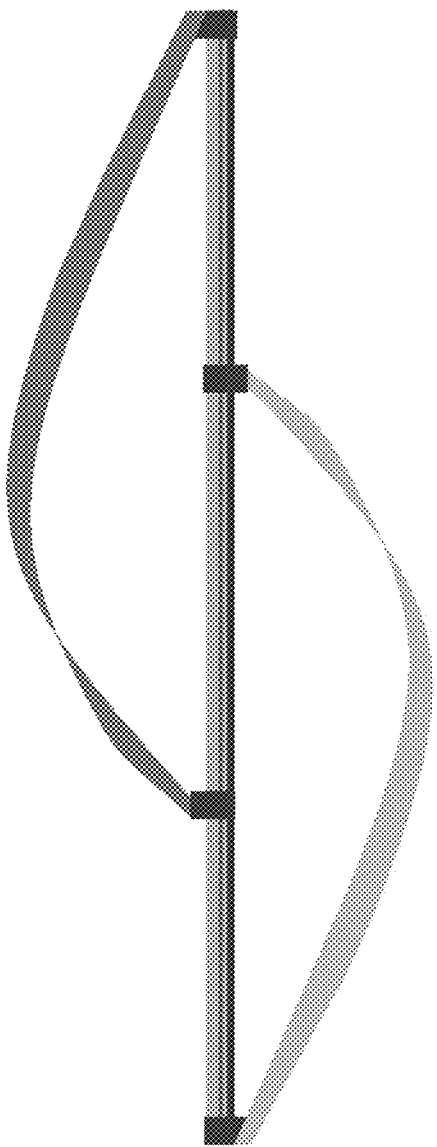
FIG. 11 shows a perpendicular axis turbine with a 50%-offset helical troposkein rotor.
Figure 12A:
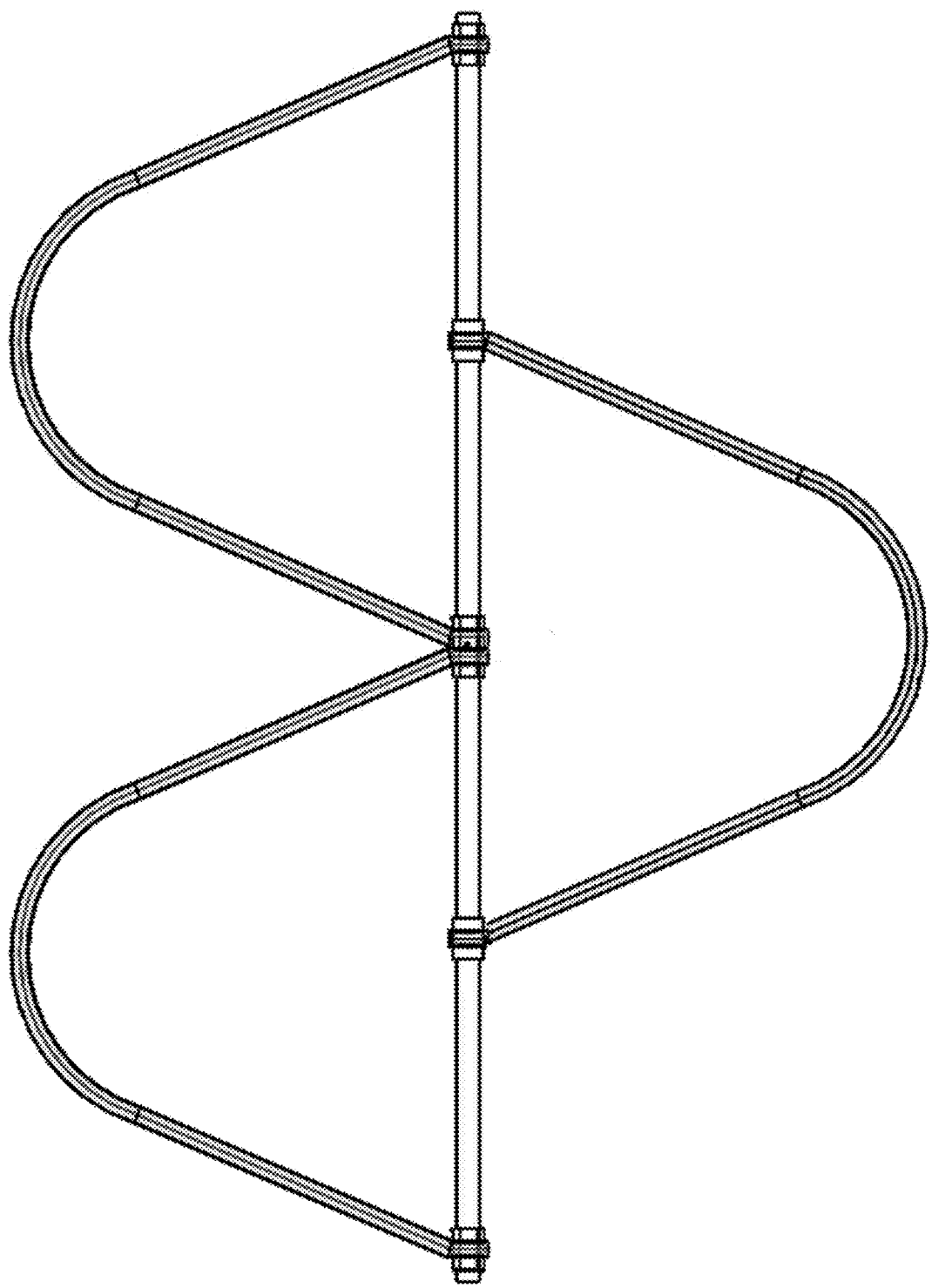
FIG. 12A shows a three-bladed perpendicular axis turbine with a 50%-offset Darrieus troposkein rotor.
Figure 12B:
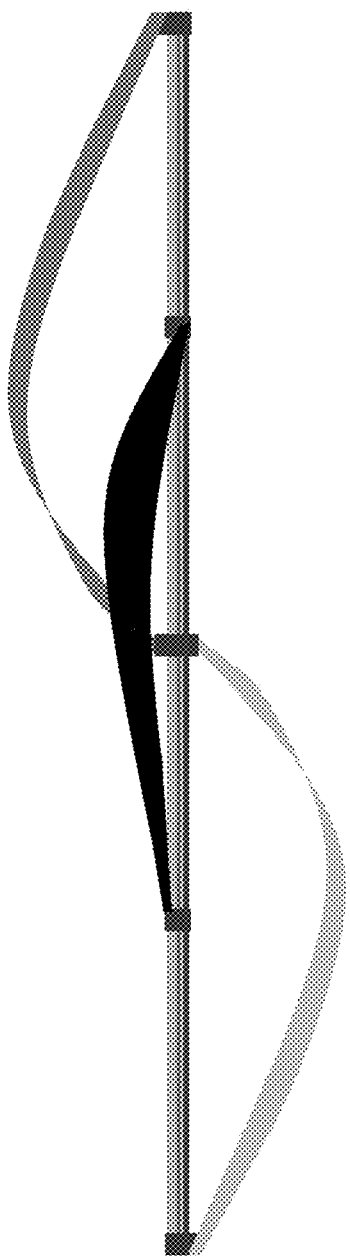
FIG. 12B shows a three-bladed perpendicular axis turbine with a 50%-offset helical troposkein rotor.

Further to the above, FIG. 11 shows a two-bladed helical turbine with a 50% offset. FIGS. 12A and 12B show two different types of three-bladed 50%-offset turbines. FIG. 12A shows a perpendicular axis turbine using a Darrieus troposkein straight-arc approximation blade shape. FIG. 12B shows a three-bladed turbine using a helical blade configuration. As can be seen in FIGS. 12A and 12B, the third blade is attached to the central turbine shaft. This third blade defines an additional path when it revolves about the turbine's central axis. The profile defined by this additional path partially intersects the profile of the first blade's path and partially intersects the profile of the second blade's path.

Figure 13:
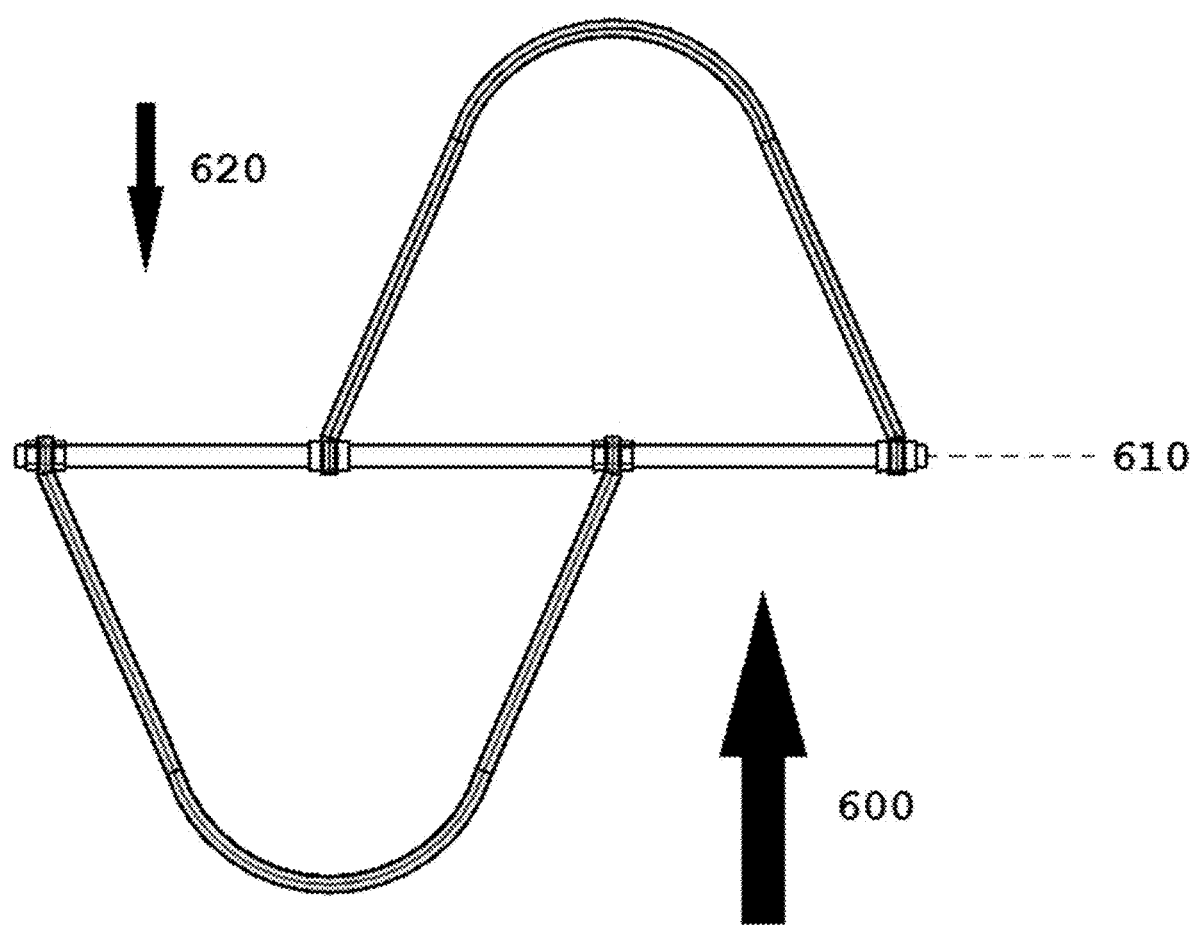
FIG. 13 is a top-down view of a perpendicular axis turbine, oriented to take advantage of tidal flows.

Additionally, although the foregoing was primarily concerned with wind turbine applications, the offset blade technique may be applied to perpendicular axis water turbines, in the same manner as for a wind turbine. FIG. 13 shows a top-down view of a two-bladed water turbine with 50% offset straight/arc approximation blades, set horizontally in the water and perpendicular to the tidal flow indicated by reference arrow 600. Due to the turbine's perpendicular axis 610, it is also able to harvest energy from reversing tides (tides that flow in the direction indicated by arrow 620).

All the different configurations of turbine and blade outlined above in FIGS. 5-12B may be equally well used in water turbine applications.

In addition to the above, a modified H-Darrieus rotor may also be used with the present invention. As can be seen from FIG. 1B, the H-Darrieus rotor uses straight airfoil blades attached to the central turbine shaft. A modified rotor can use curved airfoil cross-section blades attached to the central turbine shaft. Such a modified rotor would have its curved blades attached to the central turbine shaft using members that are substantially perpendicular to the central turbine shaft.

For this modified rotor, the blades are each attached to the central turbine shaft by rigid linear members with preferably smooth surfaces. Variants of the modified rotor may have the blades attached to the central turbine shaft using linear members that are at less than right angles to the central turbine shaft. As an example, the linear members may be at a fixed angle of 20°-90° with the central turbine shaft. Other embodiments may have these linear members at a fixed angle of 40°-80° with the central turbine shaft or at a fixed angle of 50°-75° with the central turbine shaft. As can be imagined, depending on the angle of the linear members, the blades of the modified rotor may resemble the approximated troposkein shape illustrated in FIG. 2.

EXAMPLE

The following example shows the relative power generation of three different two-bladed straight/arc VAWT configurations. These three configurations are: a conventional non-offset turbine, a turbine with a 50% offset (as in FIG. 5), and a turbine with a 100% offset (as in FIG. 7). To test the performance of these configurations, all these blade configurations were mounted on equal-height vertical turbine shafts (in this case, each turbine was 0.75 metres high), and the area swept out by each of the blades as the blade revolved about the turbine axis was kept constant at 0.36 m².

As mentioned above, holding turbine height constant means that each set of blades requires its own design. The design of troposkein blades (or their straight/arc approximations) with a specific diameter-to-height ratio ($\beta$) follows well-known equations, beginning with equation (1):

$$\beta = \frac{2k}{(1-k^2)F(\frac{\pi}{2};k)}, \quad (1)$$

where $$F(\frac{\pi}{2};k)$$

is the complete elliptical integral of the first type with parameter k, as defined in equation (2):

$$F(\phi;k) = \int_0^\phi \frac{d\vartheta}{\sqrt{1-k^2\sin^2\vartheta}}. \quad (2)$$

These equations use the cylindrical co-ordinate system (r, θ, z). For these equations, r is the radial co-ordinate (i.e. the distance outward from the central axis), θ is the angular co-ordinate (i.e. the angle between the x-axis and the point of interest), and z is the longitudinal co-ordinate (i.e. the distance along the length of the blade).

Equation (1) is derived by balancing the centrifugal forces and the tension developed along the blade. In order to find the vertical position z of any point along the troposkien blade with a radial coordinate r, one first needs to find the parameter $\phi$ according to equation (3):

$$\phi = \sin^{-1}\left[\frac{1}{\beta}\left(\frac{r}{a}\right)\right] \quad (3)$$

where $\alpha$ is the radius of the troposkien blade.

Next, $$\frac{z}{a}$$

for any vertical position z may be found, using equations (2) and (3) as above and equation (4) as:

$$\frac{z}{a} = 1 - \frac{F(\phi;k)}{F(\frac{\pi}{2};k)}. \quad (4)$$

The area swept by the blades ($A_s$) may be found as in equation (5):

$$\frac{A_s}{4a^2} = \frac{\ln\left(\frac{1+k}{1-k}\right)}{(1-k^2)F^2(\frac{\pi}{2};k)} \quad (5)$$

Blade length S can be found using equation (6):

$$\frac{S}{2a} = \frac{2}{1-k^2}\frac{E(\frac{\pi}{2};k)}{F(\frac{\pi}{2};k)} - 1, \quad (6)$$

where $$E(\frac{\pi}{2};k)$$

is the complete elliptical integral of the second type with parameter k, defined as $$E(\phi; k) = \int_0^\phi \sqrt{1 - k^2 \sin^2 \vartheta}\, d\vartheta. \quad (7)$$

The last relevant parameter, solidity (σ), can be found using the number of blades N, the "chord length" parameter c, and equations (5) and (6), as follows in equation (8):

$$\sigma = NcS/A_s. \quad (8)$$

The three sets of blades then have parameters as shown in Table 1:

TABLE 1

Specifications of Turbines

| | No offset | 50% offset | 100% offset |
|---|---|---|---|
| Number of blades (N) | 2 | 2 | 2 |
| Turbine radius [m] | 0.375 | 0.375 | 0.375 |
| Turbine height [m] | 0.75 | 0.75 | 0.75 |
| Swept area $A_s$ [m²] | 0.36 | 0.36 | 0.36 |
| Chord length c [m] | 0.1 | 0.1 | 0.1 |
| Blade height [m] | 0.75 | 0.5 | 0.375 |
| Blade length [m] | 1.10 | 0.93 | 0.855 |
| Solidity, σ | 0.59 | 0.50 | 0.46 |
| Blade weight [kg] | 0.345 | 0.290 | 0.284 |
| Blade weight/blade length ratio | 0.313 | 0.311 | 0.330 |
| Airfoil shape | NACA 0015 | NACA 0015 | NACA 0015 |

As can be seen from Table 1, both the blade length and the solidity parameter decrease as the offset increases. Shorter blade lengths and reduced solidity mean that the turbine generates less power. There is a point at which this decreased power generation outweighs the benefits of further or larger offsets. A 50% offset is an optimal compromise, as illustrated in FIGS. 14 and 15.

Figure 14:
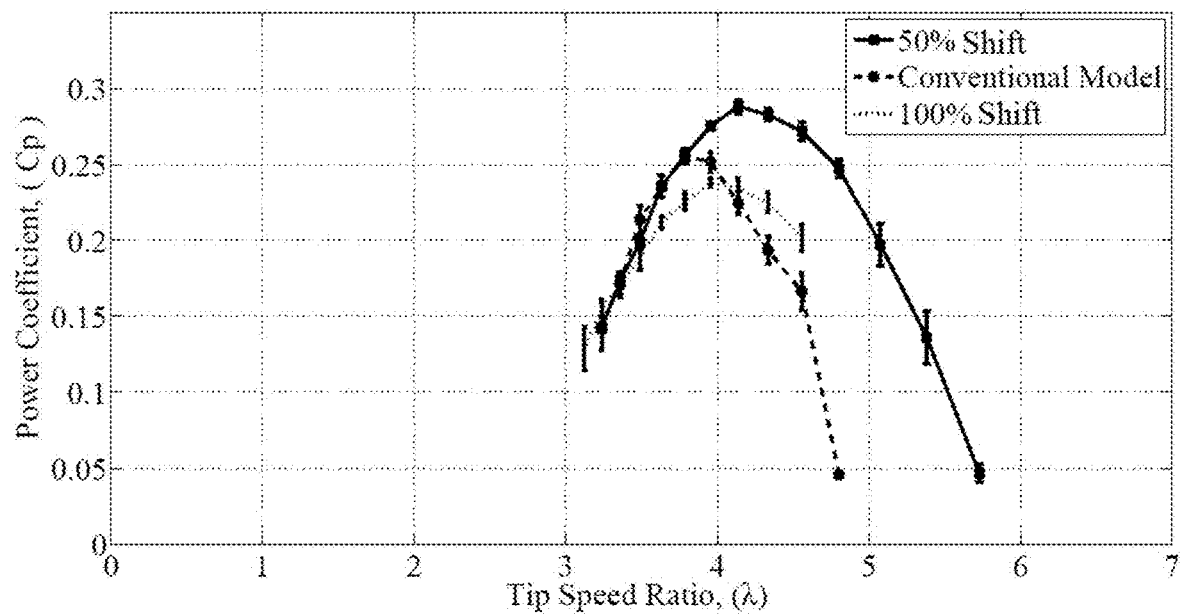
FIG. 14 is a chart illustrating the power coefficients of a non-offset turbine, a turbine with a 50% offset, and a turbine with a 100% offset, where the turbines operate at 600 RPM.
Figure 15:
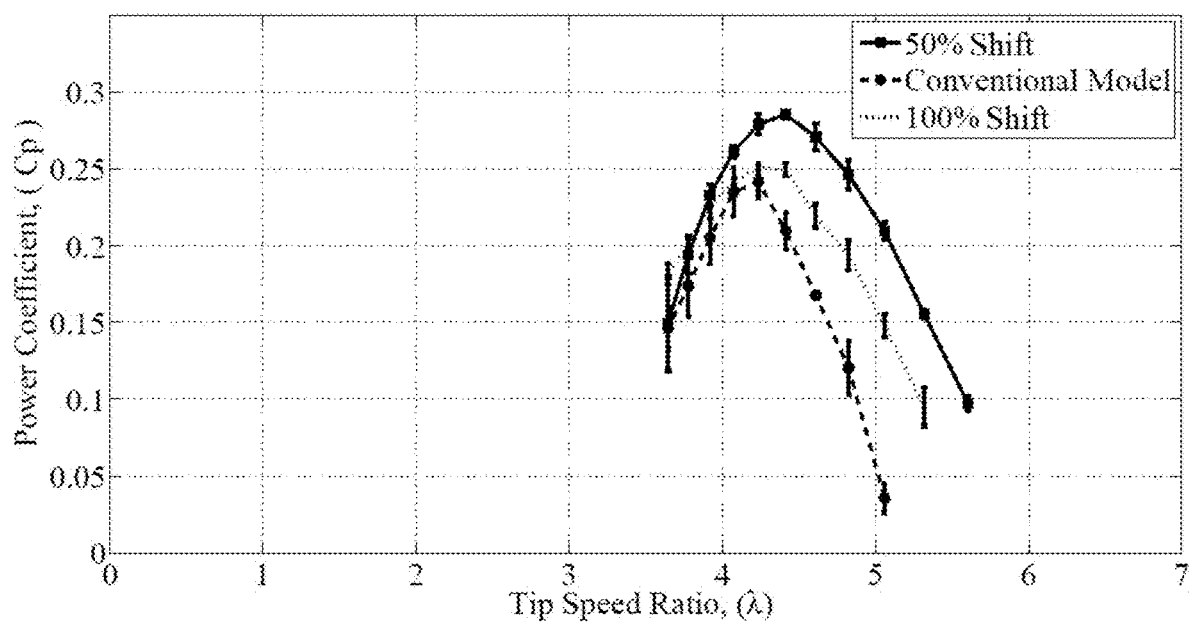
FIG. 15 is a chart illustrating the power coefficients of a non-offset turbine, a turbine with a 50% offset, and a turbine with a 100% offset, where the turbines operate at 700 RPM.

Note that FIGS. 14 and 15 show results from a laboratory setting. The data was gathered using scaled-down turbine models in a wind tunnel.

FIG. 14 shows the power coefficient for each of the three turbines as a function of the tip speed ratio, with the turbines operating at 600 RPM. "Power coefficient" is a well-known figure in the field: it is a measure of how well a given turbine extracts energy from the wind. A higher power coefficient means more energy is extracted.

At the lower end of the tip speed ratio range, the performance of the three models is roughly equivalent. However, beyond a tip speed ratio of λ≈4, the conventional non-offset turbine falls behind, and the 100%-offset turbine is only slightly better. As can be seen from the chart, the 50%-offset turbine outperforms the other designs. Furthermore, the 50%-offset turbine reaches its peak power coefficient at a higher tip speed ratio than the other two.

The contrasts between the three models are even more apparent in FIG. 15, which shows the power coefficients as a function of the tip speed ratio with the turbines operating at 700 RPM. At this higher turbine speed, the 50%-offset model remains the most efficient, followed by the 100%-offset model, and trailed by the conventional, non-offset turbine. It is clear that turbine blades that are offset by 50% provide substantially more efficient energy harvesting.

A person understanding this invention may now conceive of alternative structures and embodiments or variations of the above all of which are intended to fall within the scope of the invention as defined in the claims that follow.

We claim:

1. A perpendicular axis turbine comprising:
a central turbine shaft;
a first blade attached to the central turbine shaft, the first blade having an airfoil cross-section and a first blade shape comprising at least one arcing segment having different radii at different longitudinal positions, the first blade shape defining a first path as said first blade revolves about a central axis of said central turbine shaft; and
a second blade attached to the central turbine shaft, the second blade having an airfoil cross-section and a second blade shape that is the same as the first blade shape, said second blade defining a second path as said second blade revolves about said central axis of said central turbine shaft;
wherein the first and second blades are longitudinally offset with respect to each other so that at each longitudinal position where the first and second blades overlap, the first and second blades are disposed at different radii from the central axis; and the perpendicular axis turbine has no blade other than the first blade, that follows the first path.

2. The perpendicular axis turbine according to claim 1, comprising at least one additional blade having an airfoil cross-section, said at least one additional blade being attached to the central turbine shaft and defining an additional path as said additional blade revolves about said central axis of said central turbine shaft, wherein said additional path partially longitudinally intersects said first path and said second path.

3. The perpendicular axis turbine according to claim 1, wherein the first and second blades are each attached to the central turbine shaft using at least two attachment points.

4. The perpendicular axis turbine according to claim 3, wherein the at least two attachment points are at a longitudinal positions near opposite ends of the central turbine shaft, where a radial distance to the blade is minimum.

5. The perpendicular axis turbine according to claim 4, wherein the first and second blades are each attached to the central turbine shaft by rigid linear members with smooth surfaces, wherein said linear members are substantially perpendicular to the central turbine shaft.

6. The perpendicular axis turbine according to claim 4, wherein the first and second blades are each attached to the central turbine shaft by rigid linear members with smooth surfaces, wherein said linear members are oriented at a fixed angle of 20°-90° relative to the central turbine shaft.

7. The perpendicular axis turbine according to claim 6, wherein the linear members are oriented at a fixed angle of 40°-80° relative to the central turbine shaft.

8. The perpendicular axis turbine according to claim 7, wherein the linear members are oriented at a fixed angle of 50°-75° relative to the central turbine shaft.

9. The perpendicular axis turbine according to claim 1, wherein an attachment point for said first blade is on the central turbine shaft at a percentage distance of 1%-80% of the distance between attachment points for said second blade and an attachment point for said second blade is on the central turbine shaft at a percentage distance of 1%-80% of the distance between attachment points for said first blade, and wherein the percentage distance of the first blade is equal to the percentage distance of the second blade.

10. The perpendicular axis turbine according to claim 1, wherein one of a pair of attachment points an attachment point for said first blade is midway between a pair of attachment points for said second blade and one of said pair of attachment points an attachment point for said second blade is midway between said pair of attachment points for said first blade.

11. The perpendicular axis wind turbine according to claim 1, wherein angles between the blades are equal for even distribution.

12. The perpendicular axis wind turbine according to claim 1, wherein said first blade approximates a troposkein curve.

13. The perpendicular axis turbine according to claim 1, wherein said first blade is helical.

14. The perpendicular axis turbine according to claim 1, wherein the airfoil cross-sections of the blades are designed to be primarily driven by lift.

15. A perpendicular axis turbine comprising:
   a central turbine shaft having first and second ends;
   a first blade having an airfoil cross-section, the first blade having a first blade shape comprising at least one arcing segment having different radii at different longitudinal positions; and
   a second blade having an airfoil cross-section, the second blade having a second blade shape that is the same as the first blade shape;
   wherein:
   both the first and second blades are attached to the central turbine shaft at respective first end proximal and second end proximal attachment points;
   the first blade's attachment points are longitudinally offset from corresponding second blade's attachment points by 1%-80% of a distance between the first blade's base attachment points; and
   the first blade's attachment points relative to the first blade shape are the same as the second blade's attachment points to the second blade shape.

16. The perpendicular axis turbine according to claim 15, comprising at least one additional blade having an airfoil cross-section, said at least one additional blade being attached to the central turbine shaft and defining an additional path as said additional blade revolves about said central axis of said central turbine shaft, wherein said additional path partially longitudinally intersects said first said second path.

17. The perpendicular axis turbine according to claim 15, wherein the first and second blades are each attached to the central turbine shaft by rigid linear members with smooth surfaces, wherein said linear members are: substantially perpendicular to the central turbine shaft; or oriented at a fixed angle of 20°-90° relative to the central turbine shaft.

18. The perpendicular axis wind turbine according to claim 15, wherein:
   angles between the blades are equal for even distribution; said first blade approximates a troposkein curve; or said first blade is helical.

19. The perpendicular axis turbine according to claim 15, wherein for each blade, the attachment points are longitudinally aligned with positions of the blade shape where a radial distance to the blade is minimum.

20. The perpendicular axis turbine according to claim 15, wherein the airfoil cross-sections of the blades are designed to be primarily driven by lift.

* * * * *